United States Patent Office 3,446,571
Patented May 27, 1969

3,446,571
METHOD OF IMPREGNATING POROUS INERT BODIES, PROLONGING WATER EVAPORATION OF LAND SURFACED WATER BODIES THEREWITH, AND PRODUCTS THEREFOR
Alton V. Oberholtzer, White Bear Lake, Minn.
(2044 W. 235th Place, Torrance, Calif. 90501)
No Drawing. Filed Dec. 7, 1964, Ser. No. 416,632
Int. Cl. B27k 3/12, 3/14
U.S. Cl. 21—60.5                                   9 Claims

ABSTRACT OF THE DISCLOSURE

A composition comprising a porous inert solids material impregnated with a water insoluble film forming agent is placed in a body of ground surface water to retard evaporation of water from said body.

---

This invention relates to providing the art with an improvement in the method of more economically preventing rapid water evaporation from ground surfaced ponds, pools, reservoirs and collected water bodies, products therefor and facilitated methods of preparing the same. More particularly the improvements provided herein afford the art with a man made method of utilizing adsorbent and absorbent porous solids as relatively inert water insoluble carriers and dispersants for relatively water insoluble film forming or blanketing agents which float on the surface of a body of water to hinder and retard its evaporation rate. Such inert material, as used herein, having a common feature of providing absorbent or adsorbent characteristics, primarily through voids which are controllable filled with the film forming evaporation retarding agent, which is dispersed therefrom or in combination with the carrier material serves to provide a water surface blanketing effect retarding evaporation.

There has long been a growing problem in the art relative to saving collected water bodies from loss by surface evaporation. In this respect it may also be desired to prevent excessive ground leakage. Generally, it is known that spreading a monomolecular film of relatively water insoluble material, for example, such as long chain fatty alcohols, fatty esters, fatty glycerides, fatty acids and the like oil materials, containing fatty chains of about 8 to 22 carbon atoms and more, including other agents known to the art, will measurably prevent, retard or prolong and slow down water evaporation. With the ever increasing problem of water shortage and need for saving surface water, as well as underground and flowing water, the problem has been in effecting economical production of the protective surfacing film or covering without the need for large and excessive usage of such film forming materials. Such materials have heretofore been primarily applied in solid block, liquid or beaded form, from float containers, and solid fatty oil alcohol beads or particles in liquid emulsion form. However, such applications have appeared to be either inadequate or unsatisfactory from the standpoint of application products or economy. Theoretically, it has been calculated that it takes only a fraction of a pound, about two-tenths, to cover an acre of water with a monomolecular film of long chain fatty alcohol material. In actual practice it was found that several thousands pounds were needed to obtain coverage of a small lake of only a few acres.

Accordingly, it will be recognized that a new method of approach to the problem with more economical compositions and applications will be a more practical answer and at the same time provide a more feasible alternate solution to simplifying the preparation of products, their storage, shipment and applications, or on the spot preparation and application.

Consequently, it can be recognized that the first problem is to economically obtain as nearly a complete film or blanket coverage as possible over the water surface. Heretofore the monomolecular film has been obtained by use of an alcohol which floats on the water surface under the molecular theory of the polar alignment of hydroxyl groups therewith. The shortcoming, as indicated has arisen in the excessive amounts of bulk agent prepared in bulk form and their relative excessive costs which prevents their use. As will be hereinafter pointed, it is now possible to use the known alcohols and other known materials, including even the more expensive waxy paraffins, synthetic waxy and oil materials, including epoxy materials in economical applications with, by comparison, inexpensive relatively inert adsorbent and absorbent porous solids carriers.

Accordingly, the objects and advantages of this disclosure will be recognized from the following exemplary description and examples. However, it will be recognized how such examples are being provided as illustrate rather than limiting, inasmuch as it would be impossible to provide enumeration and illustrations of all that will be hereinafter recognized herefrom and embodied in the claims.

As indicated, the following examples are illustrative:

Example 1

A mixture of exfoliated vermiculite fines of a particle size on the order of about 100 to 500 mesh and liquid corn oil was prepared. This was accomplished by simply adding the vermiculite to a quantity of the oil body with stirring and addition of the vermiculite until a wet paste-like mass was obtained. This paste mass was dropped onto a body of tepid water of an approximate temperature of that found for collected water bodies in the south and southwestern states during the summer months. The mass sank immediately. The surprising result was observed in that the mass appeared to expand and portions thereof were separated or released which floated towards and to the top and floated about the top, at the water surface. It was amazing to observe that the apparently floating bodies of oil and extremely fine particles, when they floated to the bank sides, and oftentimes even by slow drifting collision, seemed to burst with a slight explosive action showing an outward rolling and spreading of the oil. This was observed by seeing a rolling wave action of water, oil and fine particles as the floating bodies appeared to burst open. This might have been due to entrapped air or from some strange reason of the mixture itself. The fact was that the spreading of the oil film appeared to be aided thereby with particles and oil beads entrapped in the floating oil film. It also appeared that portions of the film were much thicker than a monomolecular film thickness. By volume there was used about 8 parts solids to one part oil material.

Example 2

A mixture of the vegetable oil material of Example 1 was prepared with crumbled vermiculite solids including earth, ore and grit. To the vermiculite solids was added the vegetable oil material with stirring until the solids were wet and saturated. This mixture, when placed in a body of water sank to the bottom. A lesser quantity of some fine particle material floated to the top with released oil material which soon covered the top surface of the water. By comparative evaporation with an equal volume of water, without such covering, there was over half the volume of the coated water remaining when nearly all of the uncoated body had disappeared. Similar test results were obtained with the composition of Example 1.

The vermiculite itself may be used with the earth, ore and grit removed. However, in the expanded form it is more absorbent or adsorbent and preferred.

Example 3

A mixture of plastic solid fatty oil material of essentially $C_{18}$ carbon atoms and containing some $C_8$ to $C_{22}$ fatty carbon chains was mixed to a saturated appearing paste consistancy with the vermiculite material of Example 1. This formed a plastic moldable paste-like mass. When placed in a body of water the mass floated. It appeared to swell slightly and slowly released the oil material which gradually spread out and covered the surface of the water. This film was visible to the naked eye under a condition of refracted light.

Another sample of the above was prepared and the mass divided into a plurality of parts. These were placed on a fresh body of water and the film over the water was found to develop in a much shorter time interval.

Example 4

A mixture of the plastic solid fatty oil material of Example 3 was prepared with the vermiculite solids of Example 2. Again a plastic paste solid of oil saturated appearing earth ore material was obtained by stirring the two components together until the white solids of the oil material was the brownish color of the vermiculite and ore material. Apparently due to the higher specific gravity of the heavier particles of ore and grit material, the plastic block of the oil material mixture sank to the bottom of the water body in which it was placed. In this case the body seemed to expand and while fewer small particles were released, the oil material was, and gradually formed an oil film on the water surface.

Example 5

A more economical combination was prepared by mixing finely ground and powdered exfoliated vermiculite with just enough liquid vegetable oil to barely moisten and partially saturate the vermiculite, retaining it in loose separable particle form. When a sample of this mixture was dropped into a body of water, a portion of the particulate vermiculite sank immediately and others, smaller particulates sank more slowly. However, in just a few moments it appeared that a blanket of the oil material covered the water surface.

The volume of the oil material was about 8 to 10 times less than the volume of the vermiculite material. However, the quantity of the porous solids desired to be used is easily determined by visual observation of the oil disappearance relative to the comparative dryness appearing characteristics of the mixture. In this instance the solids powder was added until all the liquid oil material was absorbed and then an excess added with continued mixing until the whole seemed to be almost a dry powder. In this combination, the mixture was poured in its loose form, into a body of water, the particles that sank appeared to spread themselves over a wide area beneath the water surface. The oil material was rapidly released and soon covered the surface of the water. The oil film appears to have a large number of oil globules dispersed throughout the film and of more than monomolecular thickness and with finer particles of the solids carrier retained in the film. For 1 pound of the oil, about 6 pounds of the powder may be used and theoretically it takes only about 2 to ½ pound to cover an acre of water surface. The one pound or two pounds, or in 10 to 20 times this amount, of agent is not excessive.

Example 6

A sample of the mixture of Example 1 was placed in an open container and dropped into a body of water. In this case, the oil like pools formed with the thin film on the water surface. Such pools appear to be of greater than monomolecular film thickness and, in their dispersed relationship with the film, appear to provide a covering which showed a slow down of water evaporation which was better than when the loose blocks or chunk mixture was used.

Example 7

A sample of the more dry powder and ore mixture of Example 2 was packaged in a porous fabric sack and dropped into a body of water. In this instance a slow and gradual film or blanket like covering of the oil material appeared to form over and cover the water surface.

Example 8

A conventional sample of octadecanol alcohol of known water surface covering property for preventing its evaporation was melted and mixed in various batches with finely divided expanded vermiculite:

(a) To a quantity of this liquidified oil type material, the vermiculite powder was added until a fluid saturated paste of thick consistency was formed. A portion of this paste mixture, while still in a warm unset state was added to a body of water. The alcohol was apparently more solidly set by the water temperature. However, it was observed that an oil like film spread out and lay over the water surface.

(b) The remaining portion was allowed to cool and set in chunk form. When placed on a body of water there was formed an oil like appearing coating over the water surface as the chunk body seemed to swell and exude or release the alcohol. As indicated, it is unknown as to the exact reason for such and the like alcohol material to spread out into a surface covering film overlying the water. As the alcohol was released it was observed that some loose particles seemed to break away and settle to the bottom. This would indicate that having lost the advantage in specific gravity, or gain, in relative buoyancy, the particles settled to the bottom. As they do this settling, in most all cases, the particles spread out over the base. Where a crack appears to be letting out water it was observed that the particles accumulated initially thereat and later it was observed that the particles settled in a wider area over the bottom. This indicated that the outflow was reduced and the seepage, if any, more gradual.

(c) A more soupy mixture of the powdered and broken vermiculite with the melted alcohol was prepared and while still warm poured onto the water surface. The contact of the mixture with the water solidified the alcohol. However, upon remaining in the water, after a short time, the surface of the water showed formation of a gradually growing film that finally covered the body of water.

(d) Another mixture was prepared of the melted fatty alcohol material and vermiculite particles. The vermiculite was added with stirring until all the alcohol appeared to be taken up and a comparatively dry and loose particulate form of vermiculite was obtained. When poured on a water body the lighter and probably more saturated particles floated while other apparently heavier than water or not too fully saturated sank. However, as in the examples, where the other fatty oil material was in a comparatively loose form of vermiculate particles, the formation of an alcohol film over the water surface was more rapid than when the solid block form of mixture was used. It also was observed that many of the particles increased in specific gravity or lost alcohol and became water wet and sank to the bottom.

(e) Mixtures of samples (c) and (d) were placed in small cloth marble sacks and dropped on a small pond of less than an acre area. Altogether the weight was less than one pound. The next morning the bags were floating much lower in the water and there appeared to be a thin film on the smooth water surface.

Example 9

Another combination of porous solids and a solid alcohol material of essentially fatty carbon chains of 18 carbon atoms was prepared. In this case a solid otadecanol alcohol material was mixed with a volatile alcohol solvent and fines of wood charcoal. The portions of alcohol used was just sufficient to solubilize the alcohol. To the liquid alcohol was added enough of the solid carbon material until the liquid was all absorbed and then a slight excess of the carbon fines mixed in until the particles appeared not to stick and relatively dry or easily separated. When spread on a tepid body of water the particles floated and a film of the alcohol formed over the water surface.

Various combinations of the solventized alcohol were mixed in different proportions producing from relative solid masses to substantially dry appearing particles of vermiculite material, ion exchange resin material, plain dirt, charcoal dust and solid bodies of the same soaked in the alcohol. When separately put into a body of water each eventually produced an oil like film on the water surface. This appeared to be the case either of floating or submerged combinations. When submerged and released the films appeared to be heavier in some spots than others.

Example 10

Another form of porous solid and surface film forming material was prepared by saturating ion exchange material with oleyl alcohol. In this case the ion exchange material was resinous beads of the character of 8% divinylbenzene cross-linkage of a bead size of 20 to 100 mesh, unused and newly prepared. To a quantity of the liquid alcohol there was added enough of the ion exchange material to take up all the liquid alcohol. This was accomplished by simply adding and stirring until the liquid alcohol body disappeared and the beads appeared wet. Upon dropping the loose beads in a body of water the alcohol was released and rapidly formed a covering film over the water surface.

Example 11

In this instance some old used ion exchange resin beads of conventional water softening character were similarly saturated with the liquid alcohol material and when dropped into a body of water released the alcohol to float over the surface of the water.

Example 12

Another sample of solid alcohol was prepared by melting solid octadecanol and adding a mixture of the new and used ion exchange resin in equal proportions. When added to the liquid alcohol, the resin took up the liquid as it was added until the liquid disappeared. Additional alcohol was added to assure obtaining a molded block, upon recrystallization or setting of the alcohol. When the solid block was removed and placed in a body of water, it was found that after standing over night a surface film had formed on the water body. Upon remaining in the water the film continued to persist while the block slowly disintegrated.

Example 13

A mixture of paraffin solids and the solids material of Example 1 was prepared by melting the paraffin and adding the particulate material until there was no longer any paraffin left. This formed a solid mass as the paraffin cooled. The solid mass was crumbled and broken down to fine particle size. When these particles were spread onto the water surface they floated together to form a covering blanket which retarded evaporation in a manner comparable, if not better, than the released fatty oil type material above described.

In this case it appeared that the paraffinic solids material was not released and that the insulating blanket was both the vermiculite, or a like solids material which may be used, and the paraffinic solids. While finely broken and thin saturated flake solids appeared to float, the larger chunks sank and remained insert.

Upon further preparations of the solids of vermiculite material exfoliated and ground to a fine mesh size of about 100 mesh to 300 mesh, including split-offs on the order of about 400 mesh and finer, different amounts of the absorbent type solids was mixed with the melted paraffinic material. In this instance the standard commercial product paraffin are used. While a conventional solvent for the paraffin can be used, as it was with the solid type alcohols or other solid, or even to the liquid agents for deeper penetration, it was convenient to melt the paraffin and add the solids which may be other than the vermiculite, as indicated.

In the above example it took about 4 to 5 times the volume of vermiculite to one volume of the melted paraffin to form a thick paste. By using the vermiculite in lesser amounts, the specific gravity of the mixture was reduced approaching more closely that of the paraffin material, permitting it to more readily keep the vermiculite afloat. This permits larger flake sizes to be used. However, the finer particle size is preferred as this permits the mixture to more thoroughly blanket the water surface.

Example 14

To indicate the advantage of the herein described combinations with a family of alcohols these can be chosen from the group marketed as "Adols"[1] and derived from long chain fatty acids and vegetable oils, as mixed alcohols derived from $C_8$ through $C_{22}$ carbon chains componds as octyl through behenic. Also may be included synthetic alcohols of straight and branch chain aliphatics of 8 carbon atoms or more, including natural and synthetic liquid ester and liquid to waxy synthetic esters of from 16 to 64 carbon atoms as described in Patent 2,877,123 of A. E. Rheinick et al., for example. These materials can be used in economical proportions, in liquid form, as described, with the above type materials by controlled addition thereto as described, for application in the appropriate manner to effect retarding of water evaporation from the surface of water bodies, as described.

While, per pound, many such materials may be relatively expensive, the proportion of controlled addition either for release or floating of inert solids over the surface of the water renders the cost more than reasonable for the savings effected. Where ponds or water reservoirs are protected and used for retained water which aids in keeping the ground water level up, it will now be recognized that such inert porous solids may be used with any suitable film forming agent, to float or release the same, for effecting evaporation control in the manner described. As will now be apparent to the reader hereof, the selection of the combination of relatively inert porous solids, and a suitable film forming agent, in liquid, melted or solventized form, to controllably saturate the porous solids and its application, as described, is a matter of personal selectivity and choice. Care being taken to use somewhat in excess of the theoretical amount of the film forming agent required to obtain adequate coverage of the water body treated with the combination, in either the solids or liquid form, as described.

Example 15

From the above description it will be readily recognized that upon proper selection of either a solid serving as the buoyancy agent or the particular film forming agent serving as the buoyancy agent, a film of the mixture of material may be cast over the water surface to prevent its rapid evaporation, as described. For example, an inexpensive filler material as the vermiculite, may be mixed with a solid alcohol, in melted or solventized form, and extruded or spread in thin film form over the pond, reservoir or the like. Otherwise, a paraffin or wax like material in liquid form, as described, having the property of buoyancy, may be mixed with the vermiculite, or other solids and cast in film form over the pond or reservoir. To illustrate, a sample of alcohol solids, octadecanol dis- ---
[1] Archer-Daniels-Midland Co.

solved in a slight excess of alcohol was mixed with vermiculite flakes and powder until the solids were saturated and retained a slightly fluid state to plastic state. This was pressed to thin sheet forms and laid over a body of water. Alternatively, a small sample of this mixture was diluted with solvent to a pourable liquid state and when poured on water formed its own film.

Example 16

A body of ground up stems and leaves were partially soaked in a melted portion of fatty alcohol. When the mass was removed and the alcohol reset, the mass was broken up and the particles distributed over a water body. A floating film of the alcohol and cellulosic material rapidly formed over the water surface. As the alcohol was dispersed particles of the solids sank to the bottom. Another portion of partially broken leaves was soaked in liquid vegetable oil. The leaves were removed and dropped into a water body. A floating oil film was rapidly formed over the water surface. It will thereby be apparent that waste vegetation matter, as straw, leaves, pith, sawdust, and the like may be impregnated with a measured amount of suitable alcohol, suitable oil or suitable waxy material and cast upon the surface of a body of water to form a film thereover under the principles of Archimedes. One of the primary features of utilizing the materials in the manner herein described is the provision of films of longer duration than when cast in an excess of fine particle emulsion form. Under protected conditions, out of the wind, the films remain relatively stationary. Under exposed shifting wind conditions, the relatively saturated materials, which float, will also continue to supply a film forming mechanism as they are shifted about and until exhausted. In the event the specific gravity of the impregnated porous material is greater than the specific gravity of the water and the film forming agent is gradually released therefrom. In any of these applications, a constant source of supply is afforded by replenishing the water body with new measured quantities of impregnated solids from time to time, as needed.

From the above description it will be recognized that by utilizing a relatively inexpensive and harmless solid porous adsorbent or absorbent in the nature of vermiculite material, resinous material, carbon material and the like of a spong-like characteristic, either in fine particle form or block form, the amount of saturation with any suitable and known agent can be controlled more economically to efficiently provide a water surface covering which prolongs exaporation of the body of water. In addition, it is now shown how it is economically feasible to utilize the solids as a portion of the covering material. Dut to its light weight and chemical and physical properties, also being an ion exchange material, the preferred solids is the expanded vermiculite in fine particle form.

However, as indicated, other less desirable adsorbent or absorbent materials having voids which can likewise be measurably saturated or filled by the controlled liquid state and amount of such water evaporation preventing agents, as known to the art, may be used. Other less desirable solids carriers may be resinous sponges, dirt, natural sponge material, absorbent cellulosic material and the like having added controlled amounts of suitable film forming water evaporation preventative agents impregnated therein, as described. It will be apparent that such combinations, as contemplated herein may be prepared at the water site, or prefabricated and transported or shipped to the point of use. Further, as illustrated, the combinations may be used, as such, or placed in containers and made to sink or float, as desired.

Having thus described a more convenient and economical way to control preparation and dispersion of water evaporative control agents, it will be apparent that while some variations of the materials and combinations, as herein contemplated and described, may be made, the essential principles may not be utilized within the sense of the following claims.

I claim:
1. The method of retarding surface evaporation from collected ground surface water bodies comprising the process of impregnating a porous inert solids material having a greater apparent density than water with a measured quantity of water insoluble film forming agent, placing the impregnated solids material in the collected water body and forming a film therefrom of the impregnated material over the surface of the water, with the said solids sinking below the water surface and effecting thereby a slowdown of water evaporation.

2. The process of claim 1, wherein the porous solids material is vermiculite material and the water insoluble film forming material is selected from the group consisting of fatty oil material, paraffinic and waxy material and having the property of floating on the water surface and forming a film thereof thereover.

3. The process of claim 1 wherein at least a portion of the porous inert solids are in fine particle form of about 100 to 400 mesh size and water insoluble film forming agent is fatty alcohol.

4. A product prepared for distribution in a body of ground surface water and to form a film thereover for retarding surface evaporation of the water body comprising a porous inert solids material of greater apparent density than water impregnated with a water insoluble film forming agent selected from the group consisting of fatty oil material, paraffinic and waxy material and having the property of floating on the water surface and forming a film thereover.

5. The product of claim 4 wherein the porous inert solids material is selected from the group consisting of an earth material, a non-floating porous resin material and non-floating cellulosic material, and the fatty oil material film forming agent is a fatty alcohol.

6. The product of claim 4 wherein the porous inert solids is an ion exchange resin.

7. The product of claim 4 wherein the porous inert solids is expanded vermiculite material.

8. The product of claim 4 wherein the porous inert solids is a cellulosic material and the film forming agent contains carbon chains of $C_8$ to $C_{22}$ carbon atoms.

9. The method of enclosing a body of water insoluble film forming agent within a solids of greater apparent densit than water, placing the solids within a water body below the surface thereof and releasing the said film forming agent therefrom.

References Cited
UNITED STATES PATENTS

| | | | |
|---|---|---|---|
| 2,797,139 | 6/1957 | Veatch | 21—60.5 |
| 2,797,141 | 6/1957 | Veatch | 21—60.5 |
| 3,085,850 | 4/1963 | Egan | 21—60.5 |
| 3,127,235 | 3/1964 | Benzel | 21—60.5 |

OTHER REFERENCES

R. E. Kirk et al., "Encyclopedia of Chemical Technology," 12, 291 and 1, 4, Interscience Encyclopedia, Inc., New York, 1954.

MORRIS O. WOLK, Primary Examiner.

SIDNEY MARANTZ, Assistant Examiner.

U.S. Cl. X.R.

61—1